No. 683,916. Patented Oct. 8, 1901.
J. E. DUDLEY.
COMBINED CALIPERS AND DIVIDERS.
(Application filed Feb. 19, 1901.)
(No Model.) 2 Sheets—Sheet 1.
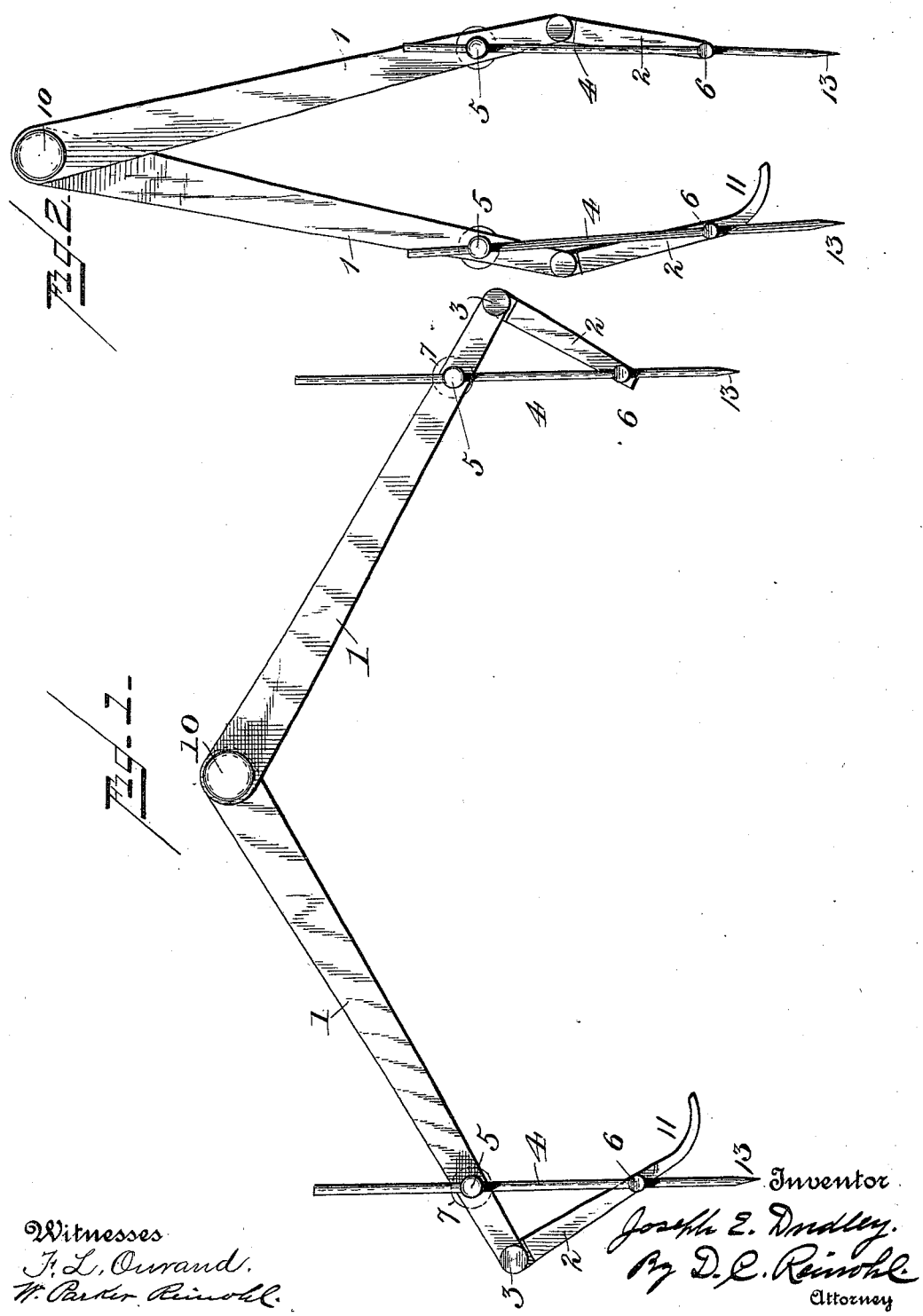
Witnesses
F. L. Ouvrand.
W. Parker Reinohl.
Inventor
Joseph E. Dudley.
By D. C. Reinohl
Attorney No. 683,916. Patented Oct. 8, 1901.
J. E. DUDLEY.
COMBINED CALIPERS AND DIVIDERS.
(Application filed Feb. 19, 1901.)
(No Model.) 2 Sheets—Sheet 2.
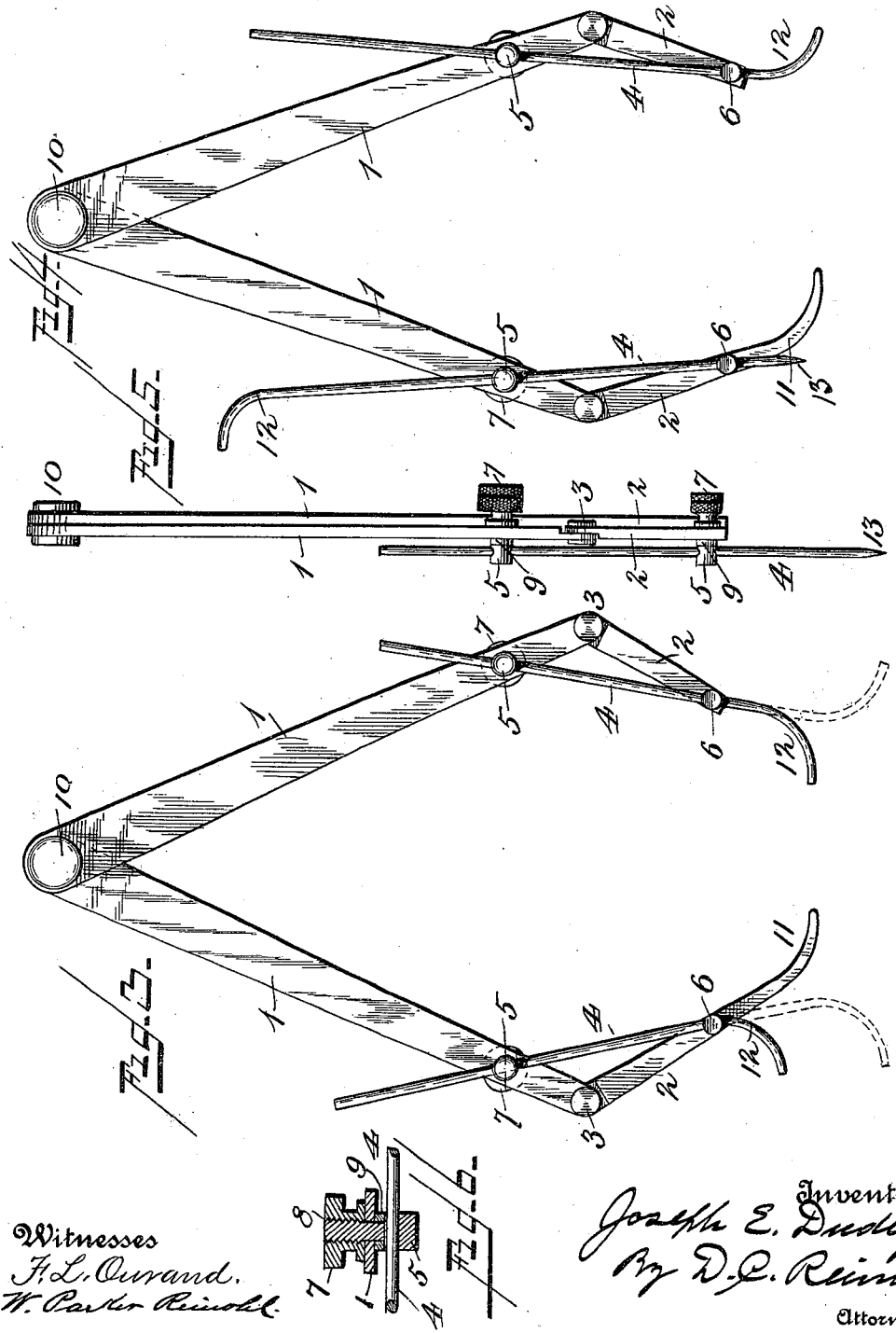
Witnesses
F. L. Ourand.
W. Parker Reinohl.
Inventor
Joseph E. Dudley.
By D. P. Reinohl
Attorney

UNITED STATES PATENT OFFICE.

JOSEPH E. DUDLEY, OF WASHINGTON, DISTRICT OF COLUMBIA.

COMBINED CALIPERS AND DIVIDERS.

SPECIFICATION forming part of Letters Patent No. 683,916, dated October 8, 1901.

Application filed February 19, 1901. Serial No. 47,897. (No model.)

*To all whom it may concern:*

Be it known that I, JOSEPH E. DUDLEY, a citizen of the United States, residing at Washington, in the District of Columbia, have invented certain new and useful Improvements in a Combined Calipers and Dividers; and I do hereby declare the following to be a full, clear, and exact description of the invention, such as will enable others skilled in the art to which it appertains to make and use the same.

My invention relates to calipers or dividers, has especial reference to a combined calipers and dividers adapted for use as a combination-tool, which may be used by machinists and other mechanics for many purposes—such as a trammel, dividers, centering-calipers, inside calipers, outside calipers, and others which will suggest themselves in the use of the tool; and it consists in certain improvements in construction which will be fully disclosed in the following specification and claims.

In the accompanying drawings, which form part of this specification, Figure 1 represents a side elevation of my invention, showing one form thereof for use as a trammel; Fig. 2, a like view of the same for use as dividers; Fig. 3, a like view of the same for use as inside or outside calipers; Fig. 4, a like view of the same for use as centering-calipers; Fig. 5, an edge view, and Fig. 6 an enlarged detail view showing the eye-post of one part of a leg and a separate member supported therein.

Reference being had to the drawings and the designating characters thereon, 1 indicates the upper or primary section of the legs, and 2 the lower or supplemental section, which are adjustably connected together by a hinge-joint 3, so that the section 2 may be set at any desired angle of inclination to section 1, and the two sections are securely locked in their angular relation by a separate contact or working member 4, which may be a metal rod or other scriber or a pencil, and forms the chord of a truss whose sides are the sections 1 and 2 of the leg and stiffen the leg for use. Each section is provided with an eye-post, (5 on section 1 and 6 on section 2,) in which eye-post the member 4 is adjustably secured by being clamped by the nut 7 engaging the screw 8 of the post and drawing the member 4 up to and against the washer 9, between the eye and the section of the leg. The legs being adjustably connected at their outer ends by joints 10, they may be separated to suit the purpose for which use requires and may thus form a substitute for a trammel, as shown in Fig. 1, in which position the member 4 is a pointed rod or scriber and serves to mark or describe a circle or the arc of a circle. In this use of the tool it will be seen that the truss formed by the sections 1 and 2 and the chord 4 greatly stiffens the long legs of the instrument. The legs may be brought closer together and the angle of the sides of the truss changed to form dividers, as shown in Fig. 2.

One of the sections 2 is provided with a curved caliper end 11, which does not interfere with the use of the instrument as a trammel or a divider; but when it is desired to use the instrument as a caliper the other leg is provided with a member 4, having a curved or caliper end 12, as shown in Fig. 4, when the caliper may be used as a centering-caliper, as is well understood by machinists, and when it is desired to make an outside caliper the member 4, with the curved end 12, is reversed or turned inward to act in conjunction with the end 11 of section 2, and when it is desired to use the instrument as an inside caliper both legs are provided with a separate member having a curved or caliper end 12 and adjusted, as shown by dotted lines in Fig. 3. When the instrument is provided with two members 4, with curved ends 12, a caliper is produced that may be used for any and all purposes of calipers by adjusting the members 4 to suit the condition of the work.

Many other uses of the instrument will be suggested to the skilful mechanic, as it is capable of almost unlimited adjustment for conversion into different forms and constitutes a desirable combination-tool that fills a long-felt want in the shop.

It is obvious that the member 4 may be curved at one end, as at 12, and pointed at the opposite end, as at 13, thus making the one serve the purpose required in a caliper and in a divider, as shown on one side of Fig. 4.

Having thus fully described my invention, what I claim is—

1. A calipers or like instrument having a leg in two parts adjustably joined together at their adjacent ends, and a bracing member adjustably connected to both of said parts at a distance from the joint.

2. A calipers or like instrument having legs in two parts adjustably joined together, and a separate adjustable contact or working member on each leg connected to the two parts thereof.

3. A calipers or like instrument having a leg in two parts adjustably joined together, the lower member of which leg is curved, and a separate contact or working member connected to said parts and forming the chord of a truss.

4. A calipers or like instrument having a leg in two parts adjustably joined together and each part provided with an eye-post, and a separate contact or working member supported by said posts and connected to the two parts of the leg.

5. A calipers or like instrument having a truss formed in one leg thereof, the chord of which truss is a contact or working member in outside calipering.

In testimony whereof I affix my signature in presence of two witnesses.

JOSEPH E. DUDLEY.

Witnesses:
D. C. REINOHL,
T. W. EVERSOLE.